(12) United States Patent
Domingo et al.

(10) Patent No.: US 8,312,300 B2
(45) Date of Patent: Nov. 13, 2012

(54) LIMITING POWER IN REDUNDANT POWER SUPPLY SYSTEMS

(75) Inventors: Reynaldo P. Domingo, Spring, TX (US); Mohamed Amin Bemat, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 484 days.

(21) Appl. No.: 12/533,890

(22) Filed: Jul. 31, 2009

(65) Prior Publication Data

US 2011/0029788 A1  Feb. 3, 2011

(51) Int. Cl.
*G06F 1/26* (2006.01)
(52) U.S. Cl. ........................ 713/300; 713/340
(58) Field of Classification Search .......... 713/300–340; 307/55, 62–64, 80
See application file for complete search history.

(56) References Cited

U.S. PATENT DOCUMENTS

| | | | |
|---|---|---|---|
| 5,428,524 A * | 6/1995 | Massie | 363/79 |
| 5,761,084 A * | 6/1998 | Edwards | 700/293 |
| 2004/0003306 A1* | 1/2004 | Oomori | 713/300 |
| 2006/0161794 A1* | 7/2006 | Chiasson et al. | 713/300 |
| 2009/0307514 A1* | 12/2009 | Roberts et al. | 713/330 |
| 2010/0052426 A1* | 3/2010 | Carter et al. | 307/64 |
| 2010/0123428 A1* | 5/2010 | Wu et al. | 320/102 |
| 2010/0164292 A1* | 7/2010 | Freeman et al. | 307/80 |
| 2010/0211807 A1* | 8/2010 | Akimoto | 713/310 |
| 2010/0264741 A1* | 10/2010 | Togare | 307/80 |

* cited by examiner

*Primary Examiner* — Raymond Phan
(74) *Attorney, Agent, or Firm* — Kevin M. Hart

(57) ABSTRACT

A redundant power supply system includes power limit logic and plural power supplies. The power limit logic is configured to impose a first power limit threshold on the power supply system during a first time period in which one or more of the plural power supplies is being enabled, and a second power limit threshold higher than the first power limit threshold during a second time period.

19 Claims, 5 Drawing Sheets

US 8,312,300 B2

LIMITING POWER IN REDUNDANT POWER SUPPLY SYSTEMS

FIELD OF THE INVENTION

This invention relates generally to the field of electric power supplies.

BACKGROUND

An electric power supply is a device or system that is capable of providing electrical energy to a load—typically by converting electrical energy from one form to another to make the energy compatible with the load's requirements. For example, an electric power supply might convert 120 or 240 volt alternating current ("AC") energy to lower-voltage, regulated direct current ("DC") energy appropriate for use by an electronic device such as a computer system. Sometimes power supplies are integrated with the devices for which they supply energy. In other applications, power supplies are discrete components and can be internal or external to the load.

It is known to employ redundant power supply schemes in electronic systems for which high availability is necessary. For example, a server computer that hosts a mission-critical application process for an enterprise may be equipped with two or more power supplies in a power-supply redundant arrangement so that the server may continue to operate even if one of the power supplies fails. In such power-supply redundant systems, the plural power supplies in combination have more than enough source energy to drive the load such that, in the event that one or more of the power supplies fails, the remaining power supplies can continue to source sufficient energy the load. The term "redundant power supply system" as used herein is intended to include these and other systems in which plural power supplies are employed to supply power to a load.

DETAILED DESCRIPTION OF THE PREFERRED EMBODIMENTS

The inventors hereof have observed that catastrophic failures can occur in redundant power supply systems when, for example, a short circuit or other fault condition appears in the load. If only a single power supply were used to supply power to the load, then the maximum current that could be drawn by the short circuit would be the maximum current that the one power supply is capable of sourcing. But if numerous power supplies are coupled to the load, then the current that could be drawn by the short circuit can be the aggregate of the maximum capacities of all of the plural supplies. Current flow under these circumstances can grossly exceed safe levels and could ultimately cause fire or equipment damage.

Figure 1:
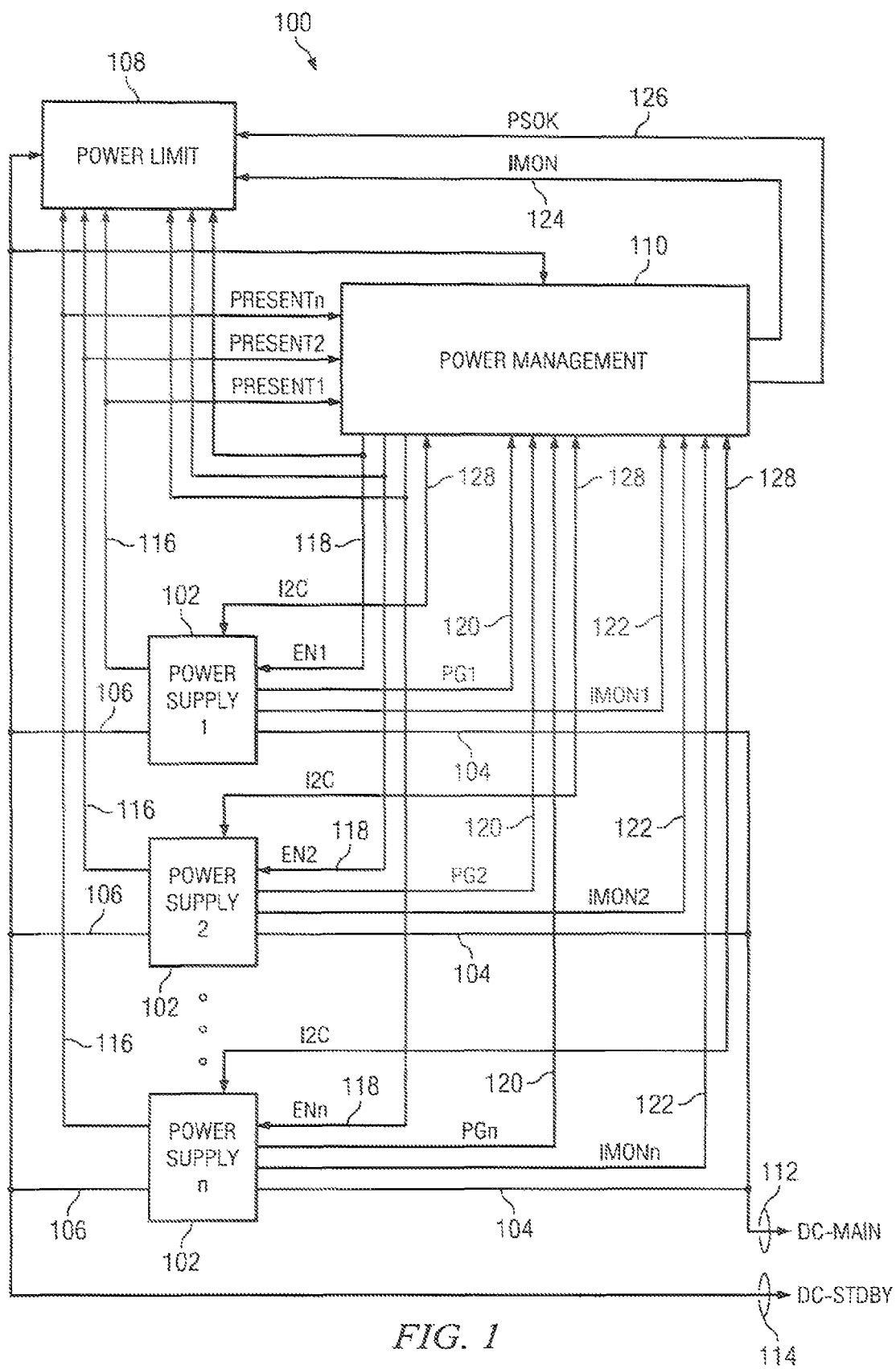
FIG. 1 is a block diagram illustrating an example redundant power supply system that employs power limiting according to a preferred embodiment of the invention.

FIG. 1 illustrates, by way of example, a redundant power supply system 100 that addresses this problem beneficially. Power supply system 100 includes plural power supplies 102. System 100 can include any number of supplies 102 in a variety of configurations. Moreover, supplies 102 may be of any general type (e.g. switching power supplies, linear power supplies or other types). Each of power supplies 102 has a main power output 104 and a standby power output 106. Both of the main and the standby outputs are configured to supply DC power. The main output may be used to supply power to a load, while the standby output may be used to supply power to control circuitry such as power limit logic 108 and power management logic 110. In the embodiment shown, all of the main power outputs of the plural power supplies are coupled together such that they produce an aggregate power output 112 for use by the load. The standby outputs 106 may also be aggregated as shown at 114.

Each of power supplies 102 is coupled to a present signal 116. Present signals 116 can be created, for example, with a voltage divider. Each present signal 116 may be coupled to a short pin of the associated power supply such that the short pin will be the last to make contact with a host connector pin when the power supply is installed in the host system, and will be the first to break contact with the host connector when the power supply is removed from the host system. When a power supply 102 sees its present signal de-asserted (as when the power supply is being removed from the host connector), the power supply is configured to cease supplying power at its main power output 104. The power supply may, however, continue to supply power at its standby output 106.

Each of power supplies 102 also has an enable input 118. When an enable input 118 of a power supply 102 is not asserted, the power supply will not supply power at its main power output 104. But when enable input 118 is asserted and the relevant present signal 116 is asserted, power supply 102 will attempt to transition to an operational state in which it is capable of supplying power at its main power output 104, up to a predetermined maximum power output rating for the power supply. Once a power supply 102 has reached this operational state without detecting a fault condition, the power supply will assert its power good output signal 120. If a power supply 102 is turned off or otherwise transitions out of its operational state, it de-asserts its power good output signal 120.

System 100 also includes monitor signals 122 associated with each of power supplies 102. Preferably, each monitor signal 122 provides an indication of the level of power currently being supplied by the associated power supply 102. In the illustrated embodiment, each monitor signal 122 is a voltage that is proportional to the amount of current being supplied by the associated power supply 102 at its main power output 104.

Power limit logic 108 is configured to impose either of two power limit thresholds on system 100 at different times. Specifically, during a first time period when power supplies 102 are being enabled by power management logic 110, power limit logic 108 imposes a lower power limit threshold on the system. During a second time period in which all of power supplies 102 have been enabled and are in their operational states, power limit logic 108 imposes a higher power limit threshold on the system. In this manner, if a fault such as a short circuit is present in a load coupled to aggregate power output 112, the amount of current sourced into the short circuit will remain within a safe level determined by the power limit thresholds.

Preferably, power limit logic 108 is configured to cause all of plural power supplies 102 to cease supplying power at their main power outputs 104 if the power being sourced through aggregate power output 112 exceeds the lower power limit threshold during the first time period, or exceeds the higher power limit during the second time period. In the embodiment shown, when either circumstance occurs, power limit logic 108 causes supplies 102 to cease supplying main power by de-asserting all of present signals 116.

In further embodiments, power management logic 110 may also programmatically cause each of power supplies 102 to limit the power on its own main power output 104 to a level that corresponds to the first power limit threshold (during the first time period) or the second power limit threshold (during the second time period). In such an embodiment, the individual power limits would be calculated by dividing the number of active power supplies by the appropriate desired aggregate power limit threshold.

In one embodiment, the lower aggregate power limit may be set to 240 VA, which is a product safety limit set by United Laboratories for user-accessible circuits. Other limits may be used. The higher aggregate power limit may also have various possible values depending on the application. For example, in one possible embodiment in which each of supplies 102 shares a common maximum rated output power, the higher power limit may be set to 1.2 times the common maximum rated output power of the supplies. Other multiples may also be used. In another embodiment, the higher power limit may be set to 1.2 times the maximum power requirement of a load that is coupled to aggregate power output 112. Other multiples may be used in this embodiment as well.

In one embodiment, when power management logic 110 enables power supplies 102, it does so sequentially. In this manner, power being sensed on monitor signals 122 will more accurately reflect steady state system conditions. If power supplies 102 are enabled simultaneously, it is possible that one or more of the supplies may transiently act as a load to the other supplies, temporarily causing one or more monitor signals 122 to spike. In another embodiment, power management logic 110 may enable the power supplies in two phases. In first phase, it simultaneously enables just the minimum number of power supplies necessary to power a load when the load is turned on. In the second phase, it enables the remaining power supplies.

Power management logic 110 generates an aggregate monitor signal 124. Aggregate monitor signal 124 may be computed as any function of individual monitor signals 122. In the embodiment shown, aggregate monitor signal 124 is computed as the average of individual monitor signals 122. In such an embodiment, preferably power management logic 110 will use present inputs 116 to know how many power supplies are present in system 100, and thus to know how to divide the sum of individual monitor signals 122.

Power management logic 110 also generates an aggregate power good signal 126 as a function of individual power good signals 120. In the embodiment in which all of the power supplies are enabled sequentially, aggregate power good signal 126 may represent the logical AND of all individual power good signals 120 that correspond to power supplies 102 that are present. In the embodiment in which the power supplies are enabled in two phases, aggregate power good signal 126 may represent the logical OR of the individual power good signals.

Figure 2:
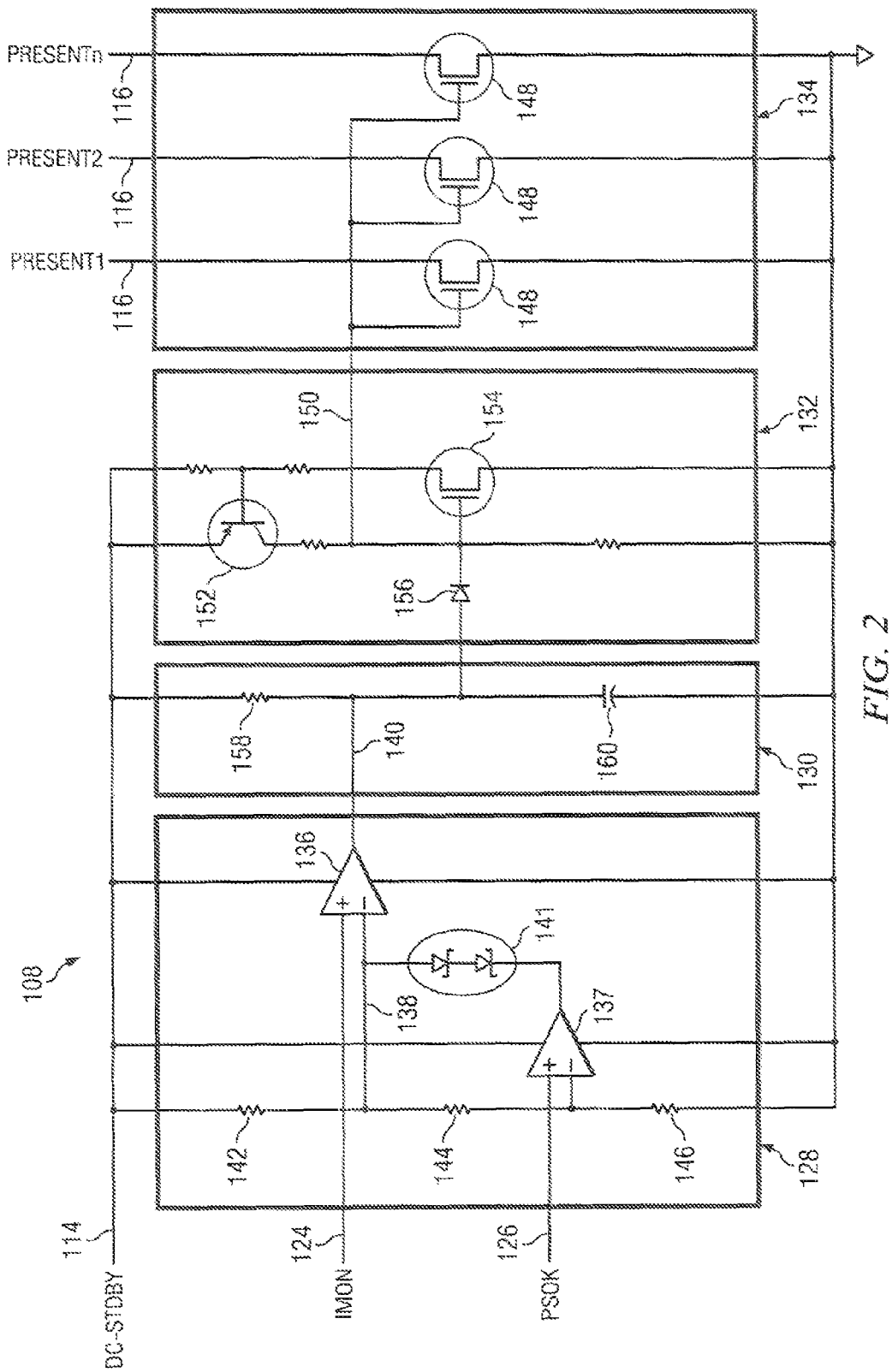
FIG. 2 is a schematic diagram illustrating a first embodiment of the power limit block of FIG. 1 in more detail.

Power limit logic 108 may be implemented in a variety of ways consistent with the above description. FIG. 2 illustrates, by way of example, a first embodiment of power limit logic 108. At a high level, this embodiment includes a comparison circuit 128, a delay circuit 130, a latch circuit 132 and a switching circuit 134.

Comparison circuit 128 includes a comparator 136 having inputs coupled to aggregate Monitor signal 124 and to a reference signal 138 as shown. Output 140 of comparator 136 will be low whenever the voltage level of monitor signal 124 is below that of reference signal 138; otherwise output 140 will be high. Reference signal 138 is configured to take either of two values, corresponding to the lower and to the higher power limit thresholds. When aggregate power supply good signal 126 is not asserted, the output of comparator 137 will be low, with the consequence that reference signal 138 will be clamped to two diode drops above ground. (See Schottky diodes 141.) In one embodiment, for example, this clamped level was approximately 0.6 volts. Other levels may be chosen depending on the application. The clamped level preferably corresponds to the lower power limit, taking into account the scale of monitor signal 124. When aggregate power good signal 126 is asserted, the output of comparator 137 will be high, with the consequence that reference signal 138 will take a value determined by the voltage divider formed by resistors 142, 144 and 146. This level preferably corresponds to the higher power limit, taking into account the scale of monitor signal 124.

Switching circuit 134 is configured to pull present signals 116 low, at least in part responsive to output 140 of comparator 136. In the embodiment shown, field effect transistors ("FETs") 148 pull signals 116 low when their gates are pulled high by node 150.

Latch circuit 132 is configured such that node 150 is low (and transistors 152 and 154 are both off) when output 140 of comparator 136 is low, as output 140 normally would be when monitor signal 124 has not exceeded the applicable threshold. But as soon as output 140 goes high, transistor 154 is turned on, with the consequences that node 150 goes high and that transistor 152 turns on and remain on. The latter condition represents the triggered condition of latch circuit 132. By virtue of diode 156, latch 132 will not return to its un-triggered condition under ordinary circumstances—even if output 140 should transition to low thereafter. This is deemed desirable so that a fault, once detected, must be remedied before system 100 can once again supply current to its load.

Although bipolar junction transistors ("BJTs") and FETs are shown as the switching elements in the example implementation as shown, other switching elements may be used, and one type may be substituted for another type depending on the application. And any type of BJT or FET can be used as appropriate.

Delay circuit 130 may be included also, to prevent power limit logic 108 from triggering on mere transient spikes in monitor signal 124. In the embodiment shown, delay circuit consists of a simple RC circuit that includes resistor 158 and capacitor 160. Delay circuit 130 causes a delay in the triggering of latch circuit 132 after output 140 of comparator 136 becomes asserted. In one embodiment, this delay was set to 10 ms. Other delays may be chosen depending on the application.

Note that, in some embodiments, it may be desirable to alter the scale of monitor signal 124. For example, this may be done using one or more voltage dividers.

Figure 3:
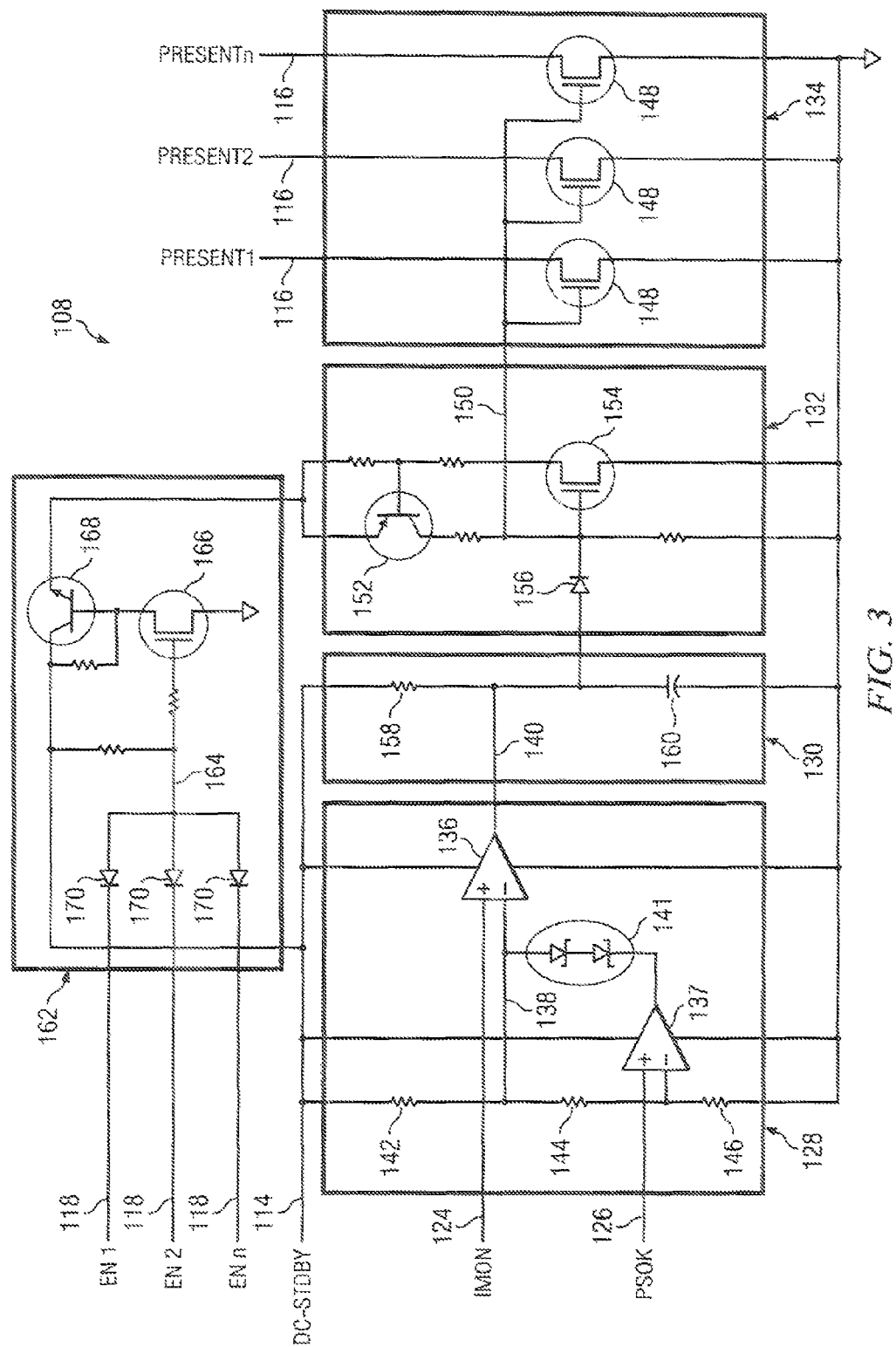
FIG. 3 is a schematic diagram illustrating a second embodiment of the power limit block of FIG. 1 in more detail.

FIG. 3 illustrates a second example embodiment of power limit logic 108 in which a reset circuit 162 has been added. The purpose of reset circuit 162 is to allow a control system such as power management logic 110 or the load itself to reset latch circuit 132 from its triggered to its un-triggered state. When control input 164 is low, FET 166 is off so that BJT 168 is on, with the consequence that standby power 114 is coupled to latch circuit 132. But when control input 164 is brought high, FET 166 is turned on so that BJT 168 is turned off, with the consequence that power is removed from latch circuit 132, thus resetting it to its un-triggered state when power is once again applied (as when control input 164 is brought low again).

In the embodiment shown, control input 164 is constructed using the enable signals 118 that are coupled to power supplies 102. Specifically, the enable signals may be coupled to node 164 via diodes 170 as shown, so that when they are all brought low simultaneously, node 164 is brought low as well. When they are brought high, node 164 is isolated from them.

Figure 4:
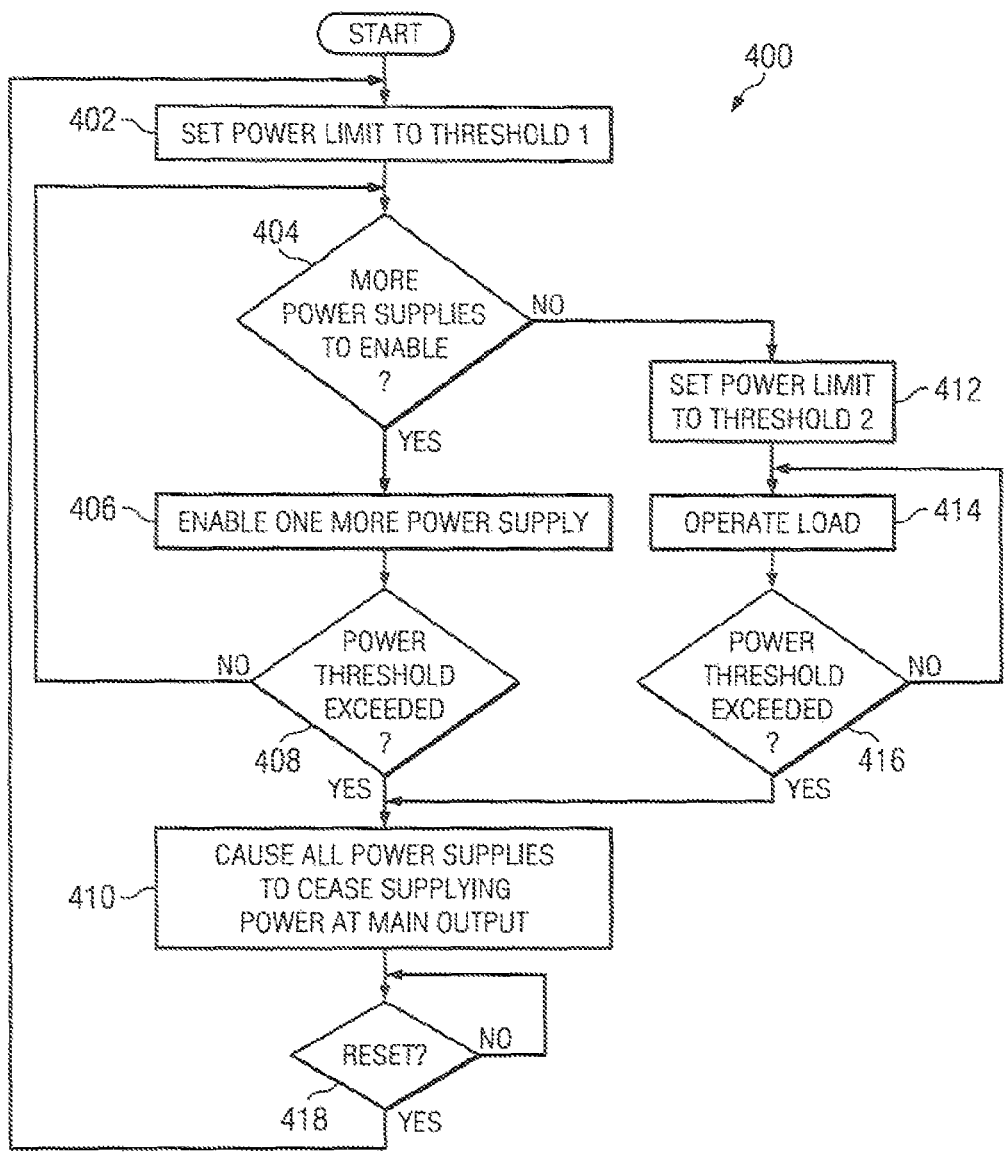
FIG. 4 is a flow diagram illustrating a first embodiment of a method of operating a redundant power supply system according to a preferred embodiment of the invention.

FIG. 4 illustrates, at 400, one embodiment of a method for operating a redundant power supply system 100 according to a preferred embodiment of the invention. In step 402, a lower power limit is imposed on aggregate power output 112 of power supply system 100. In steps 404-408, power supplies 102 are enabled sequentially. Power management logic 110 enables each power supply 102 in step 406 and waits a short time to see that the individual power good signal 120 associated with that supply has been asserted. At any time during the enablement process, if the power being supplied at aggregate power output 112 exceeds the lower power limit, step 410 is invoked. In step 410, all of power supplies 102 are caused to cease supplying power at their main power outputs 104. This may be accomplished, for example, by deasserting present signals 116 as described above.

If all of power supplies 102 reach their operational states after steps 404-408 such that the aggregate power being supplied at aggregate power output 112 has not exceeded the lower power limit, then in step 412 a higher power limit may be imposed on system 100 in lieu of the previous lower limit. Then, the load may be operated in step 414. At any time during this period of operation, step 410 may be invoked again should the aggregate power at output 112 exceed the higher limit. (See step 416.) The lower and the higher power limits may take any values depending on the application. For example, they may be set to the levels described above.

A step 418 may also be included, wherein the process may be restarted entirely at step 402 after a reset command has been given.

Figure 5:
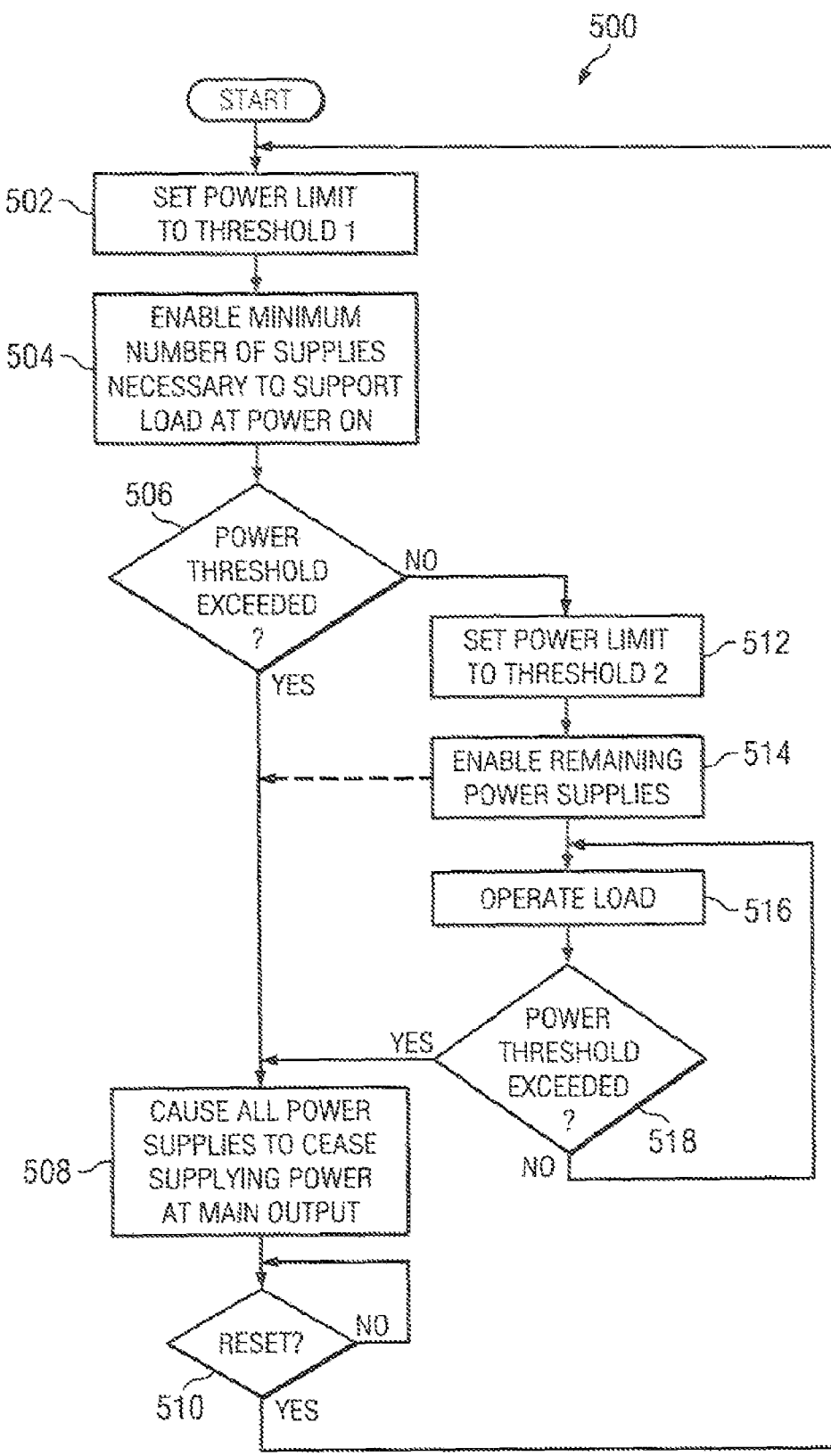
FIG. 5 is a flow diagram illustrating a second embodiment of a method of operating a redundant power supply system according to a preferred embodiment of the invention.

FIG. 5 illustrates, at 500, a second embodiment of a method for operating a redundant power supply system 100 according to a preferred embodiment of the invention. In step 502, a first power limit threshold is imposed on aggregate power output 112. In step 504, only a number (less than all) of power supplies is enabled. The minimum number corresponds to the minimum number of power supplies that are required to power a load when it is turned on. If the power limit threshold is not exceeded (step 506), then a second power limit threshold is imposed on aggregate power output 112 (step 512). In steps 514 and 516, the remaining power supplies may then be enabled and the load operated. At any time during these steps (as indicated by the dashed line and at step 518), if the second power limit threshold is exceeded, then step 508 is executed. In step 508, all power supplies are caused to cease supplying power from their main power outputs. A reset step 510, like step 418 in FIG. 4, may be included if desired.

Figure 6:
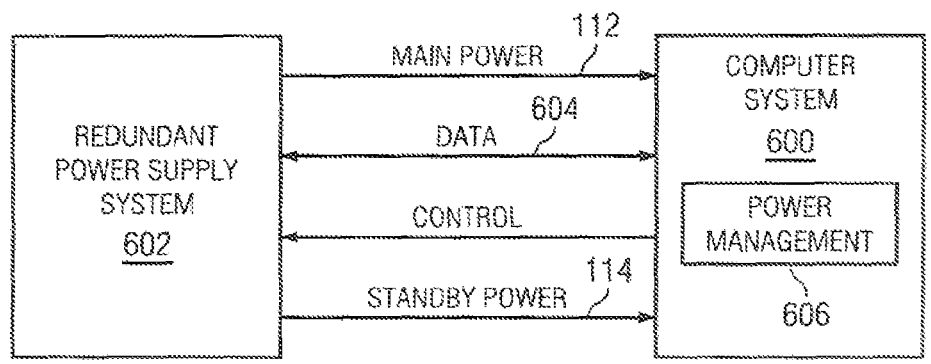
FIG. 6 is a block diagram illustrating a computer system coupled to a redundant power supply system according to another preferred embodiment of the invention.

Redundant power supply system 100 and method 400/500 may be implemented in a wide variety of applications. For example, it is possible to implement the power management and power limiting functions using a digital control system rather than using a hardwired circuit such as power limit circuit 108. FIG. 6 illustrates one such embodiment. A computer system 600 is coupled as a load to a redundant power supply system 602. Computer system 600 receives DC power from main power output 112, and standby power from output 114. Monitor signals 122 and power good signals 120 may be transmitted to computer system as data 604. Computer system 600 may issue control signals to power supply system to control its behavior using control lines 606. For example, control lines 606 may correspond to I2C serial links 128. The functions of the circuitry of FIGS. 3-4 as described above may be emulated by power management logic 606 within computer system 600. (In other embodiments, logic 606 may be located outside computer system 600.) Logic 606 may be powered by standby output 114, while the remainder of computer system 600 may be powered by main output 112.

While the invention has been described in detail with reference to preferred embodiments thereof, the described embodiments have been presented by way of example and not by way of limitation. It will be understood by those skilled in the art and having reference to this specification that various changes may be made in the form and details of the described embodiments without deviating from the spirit and scope of the invention as defined by the appended claims.

What is claimed is:

1. A redundant power supply system, comprising:
  plural power supplies, each of the plural power supplies comprising a main power output; and
  power limit logic configured to:
  impose a first power limit threshold on the main power output included in each of the plural power supplies to a first value that corresponds to the first power limit threshold during a first time period in which one or more of the plural power supplies is being enabled, and
  impose a second power limit threshold on the main power output to a second value that corresponds to the second power limit threshold during a second time period in which the one or more power supplies have been enabled, wherein the second power limit threshold is higher than the first power limit threshold.

2. The redundant power supply system of claim 1, wherein:
  the plural power supplies produce an aggregate power output; and
  the power limit logic is configured to cause all of the plural power supplies to
  cease supplying power from their main power outputs if the aggregate
  power output exceeds the first power limit threshold during the first time
  period or the second power limit threshold during the second time period.

3. The redundant power supply system of claim 1, wherein: the first power limit threshold is 240V A.

4. The redundant power supply system of claim 1, wherein:
  each of the plural power supplies is equal to a predetermined maximum power output rating; and
  the second power limit threshold is 1.2 times the predetermined maximum power output rating of each of the plural power supplies.

5. The redundant power supply system of claim 1, wherein:
  the second power limit threshold is 1.2 times a maximum power requirement of a
  load that is coupled to the redundant power supply system.

6. The redundant power supply system of claim 1, further comprising:
  power management logic configured to enable the plural power supplies sequentially during the first time period.

7. The redundant power supply system of claim 2, further comprising:
- a monitor signal configured to indicate a level of the aggregate power output;
- a power good signal configured to indicate when all of the plural power supplies
- have been enabled; and
- a comparator with inputs coupled to the monitor signal and to a reference signal,
- the reference signal configured to take the first value corresponding to the
- first power limit threshold when the power good signal is not asserted, and
- to take the second value corresponding to the second power limit threshold when the power good signal is asserted.

8. The redundant power supply system of claim 7, wherein:
- the power limit logic is configured to deassert a plurality of present signals, each
- present signal coupled to one of the plural power supplies, in order to cause
- all of the plural power supplies to cease supplying power from their main
- power outputs.

9. The redundant power supply system of claim 8, wherein:
- the power limit logic is configured to deassert the plural present signals responsive
- at least in part to an output of the comparator.

10. The redundant power supply system of claim 9, further comprising:
- a latch circuit responsive to the output of the comparator; and
- wherein the power limit logic is configured to deassert the plural present signals
- responsive to a state of the latch.

11. The redundant power supply system of claim 10, further comprising:
- a reset circuit coupled to the latch circuit, configured to reset the latch from a
- triggered state responsive to at least one control input.

12. The redundant power supply system of claim 11, wherein:
- the at least one control input comprises enable signals that are coupled to each of
- the plural power supplies; and
- the reset circuit is configured to reset the latch circuit when all of the enable
- signals are deasserted simultaneously.

13. The redundant power supply system of claim 10, further comprising:
- a damping circuit coupled between the latch circuit and the output of the comparator, configured cause a delay in the triggering of the latch circuit after the output of the comparator becomes asserted.

14. A method of operating a redundant power supply system that comprises
- plural power supplies, each having a main power output, and wherein the main power outputs are configured to produce an aggregate power output to
- a load, the method comprising:
- imposing a first power limit threshold on the aggregate power output;
- enabling a set of the plural power supplies; and
- if all of the plural power supplies in the set reach an operational state and the aggregate power output has not exceeded the first power limit threshold,
- imposing a second power limit threshold in lieu of the first power limit threshold, wherein the second power limit threshold is higher than the first power limit threshold.

15. The method of claim 14, wherein:
- enabling the set of plural power supplies comprises enabling all of the plural
- power supplies sequentially.

16. The method of claim 14, wherein:
- enabling the set of plural power supplies comprises enabling a number of the
- plural supplies that is less than all of the plural supplies, the number
- corresponding to a minimum number of power supplies required to supply
- a load when the load is started.

17. The method of claim 14, further comprising:
- if either of the first or second power limit thresholds is exceeded during the first or
- second timer periods, respectively, causing all of the plural power supplies
- to cease supplying power by deasserting present signals that are coupled to the plural power supplies.

18. The method of claim 16, further comprising:
- enabling the remainder of the plural supplies after the second power limit threshold has been imposed.

19. A system, comprising:
- a redundant power supply system;
- a computer system coupled to the redundant power supply system; and
- means for imposing a first limit on power supplied to the load during a time when at least one of plural power supplies within the redundant power supply system is being enabled, and for imposing a second limit on power supplied to the load after the at least one power supply has been enabled, the second limit being higher than the first limit.

* * * * *

UNITED STATES PATENT AND TRADEMARK OFFICE
CERTIFICATE OF CORRECTION

PATENT NO. : 8,312,300 B2
APPLICATION NO. : 12/533890
DATED : November 13, 2012
INVENTOR(S) : Reynaldo P. Domingo et al.

It is certified that error appears in the above-identified patent and that said Letters Patent is hereby corrected as shown below:

In column 6, line 53, in Claim 3, delete "240V A." and insert -- 240 VA. --, therefor.

In column 7, line 51, in Claim 13, after "configured" insert -- to --.

Signed and Sealed this
Second Day of April, 2013

Teresa Stanek Rea
*Acting Director of the United States Patent and Trademark Office*